United States Patent

[11] 3,545,484

| [72] | Inventor | John D. Allen |
| | | South Euclid, Ohio |
| [21] | Appl. No. | 688,513 |
| [22] | Filed | Dec. 6, 1967 |
| [45] | Patented | Dec. 8, 1970 |
| [73] | Assignee | Eaton Yale & Towne, Inc. |
| | | Cleveland, Ohio |
| | | a corporation of Ohio |

[54] PILOT-OPERATED VALVE
5 Claims, 3 Drawing Figs.

| [52] | U.S. Cl. | 137/490 |
| [51] | Int. Cl. | F16k 17/10 |
| [50] | Field of Search | 137/490, 491, 108 |

[56] References Cited
UNITED STATES PATENTS

| 2,827,075 | 3/1958 | Mercier | 137/491 |
| 3,129,720 | 4/1964 | Allen et al. | 137/490 |
| 3,252,698 | 5/1966 | Perrone | 137/490X |
| 3,373,763 | 3/1968 | Smilges et al. | 137/108X |
| 2,807,274 | 9/1957 | Evans | 137/108 |
| 2,828,760 | 4/1958 | Taylor et al. | 137/108X |

*Primary Examiner*—M. Cary Nelson
*Assistant Examiner*—Robert J. Miller
*Attorney*—Ely, Golrick & Flynn ABSTRACT: The present valve has a normally closed main valve which is pressure-unbalanced to an open position when its pilot valve opens. A control pin is slidable in a passageway leading into a pressure chamber at the inlet side of the pilot valve. The outer end of the control pin is exposed to the inlet fluid pressure acting on the main valve and it has a clearance in the passageway which provides an orifice passage for maintaining the control pin holding the pilot valve open after it is opened initially by the fluid pressure in the pressure chamber. The outer end of the control pin has a substantially larger cross-sectional area than the seated area of the pilot valve so that the valve, once opened, will not close until the inlet pressure drops substantially below the pressure at which it opened.

PATENTED DEC 8 1970

3,545,484

INVENTOR.
JOHN D. ALLEN
BY
YOUNT, FLYNN & TAROLLI

ATTORNEYS

PILOT-OPERATED VALVE

The present invention relates to a pilot-operated valve which is particularly suitable for use as a relief valve.

Conventional pilot-operated relief valves are designed to open at a certain inlet pressure and to close when the inlet pressure drops just slightly below the opening pressure. Because of this characteristic such valves are not suitable for use in certain types of hydraulic systems. For example, certain systems may employ a relatively inexpensive pump which can operate at a relatively high output pressure for only a limited period of time which, if exceeded, may damage the pump. Such a pump might be operated at high pressure during the short time required to lift a load, but it should not continue to operate at high pressure after the load is lifted and it is then required merely to hold the load at the position to which it has been lifted. Under such circumstances it is highly desirable to provide pressure relief for the pump to insure that it is not damaged.

The present invention satisfies this need by providing a valve of novel and advantageous construction which has a substantially lower closing pressure than its opening pressure. That is, while a relatively high pressure is required to open the present valve initially, it will remain open until the pressure drops substantially below the level at which it first opened.

Accordingly, it is a principal object of this invention to provide a novel and improved pilot-operated valve having a closing pressure which is substantially lower than its opening pressure.

Further objects and advantages of this invention will be apparent from the following detailed description of two presently preferred embodiments, which are illustrated in the accompanying drawing.

Figure 2:
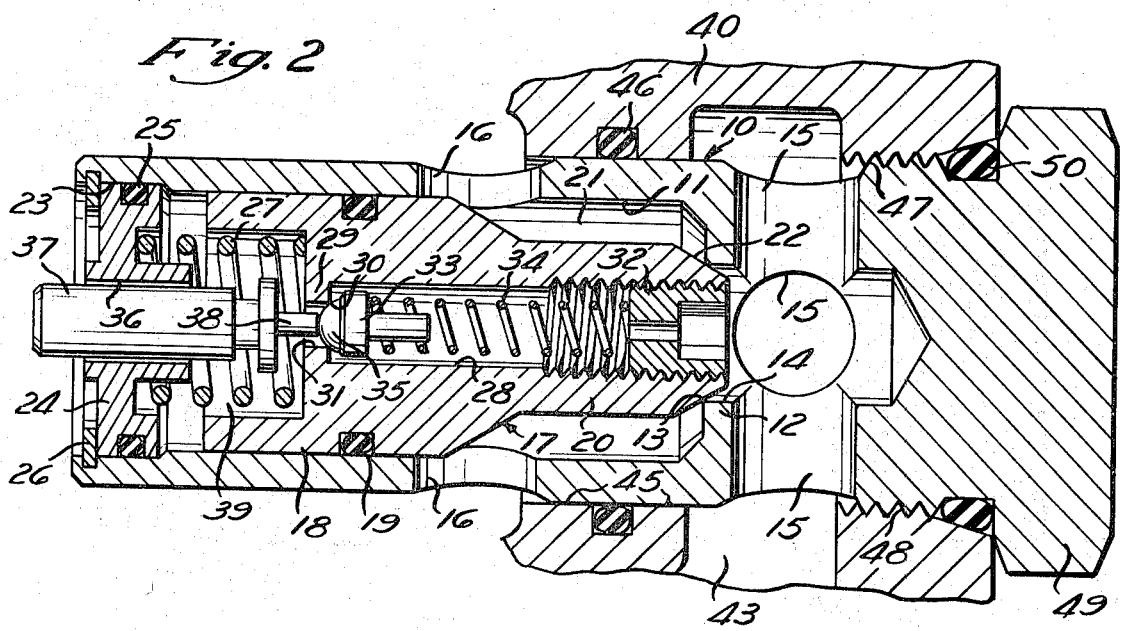
FIG. 2 is an enlarged longitudinal sectional view of the valve in the FIG. 1 assembly.

Referring first to FIG. 2, the valve illustrated there has a generally cylindrical body 10 with a longitudinally extending bore 11. At the right end of this bore the valve body has an inwardly extending, radially disposed, annular wall 12 which presents a sharp circular inside corner 13, providing a main valve seat, and a short cylindrical passage 14 extending to the right from this corner. Immediately to the right of this internal wall 12 the valve body has a plurality of laterally extending outlet passages 15 which are open to the end wall passage 14. The valve body 10 also has a plurality of radially extending inlet ports 16 which intersect the bore 11 at a location to the left of the internal wall 12.

The valve has a main valve member 17 slidably disposed within the valve body bore 11. The left end 18 of this main valve member has a close sliding fit in the bore 11 and it carries an O-ring 19 of rubber or rubberlike material which sealingly engages the bore wall. Toward its right end the main valve member has a reduced section 20 of substantially smaller diameter than the valve body bore 11, so that an annular space 21 is provided within the valve body bore around this reduced section 20 of the main valve member. This space 21 within the valve body bore 11 communicates with the inlet ports 16 in all positions of the main valve member 17 along the valve body bore. At its right end the main valve member presents an inwardly tapering nose 22 which is shaped and dimensioned to sealingly engage the valve seat 13 on the valve body internal wall 12 and to extend into the passage 14 in the latter.

At its left end the valve body 10 presents a counterbore 23 of slightly larger diameter than the bore 11. An end cap 24 is snugly seated in this counterbore and it carries an O-ring 25 of rubber or rubberlike material which sealingly engages the counterbore wall. A snap ring 26 is snugly seated in an internal annular groove on the valve body 10 to hold the end cap 24 in place. A coil spring 27 is engaged under compression between the end cap 24 and the main valve member 17 to bias the latter to the right, with its tapered nose 22 seated against the valve seat 13, as shown.

The main valve member 17 has a longitudinal bore 28, and at the left end of this bore it presents a radially disposed, inwardly extending, annular end wall 29 which presents a sharp circular inside corner 30, providing a pilot valve seat, and a short passage 31 extending to the left from this corner. The right end of the bore 28 in the main valve member 17 is screw-threaded and it threadedly receives a hollow set screw 32 having a longitudinal passage therethrough which at all times maintains the bore 28 in the main valve member 17 in fluid communication with the outlet passages 15 in the valve body 10.

A pilot valve in the form of a poppet 33 is reciprocably disposed within the bore 28 of the main valve member 17 for sealing engagement with the valve seat 30 on the latter. A coil spring 34 is engaged under compression between this poppet and the set screw 32 to normally maintain the poppet seated against its valve seat 30. The poppet presents a rounded tapered nose 35 which engages the valve seat 30 and projects into the passage 31 to the left of this valve seat.

The end cap 24 carried by the valve body 10 has a longitudinal passageway or bore 36 which slidably receives a control pin 37 with a loose fit sufficient to provide a clearance or orifice passage around the control pin. The size of this orifice passage is exaggerated in FIG. 2. The outer (left) end of this control pin is exposed to the inlet fluid pressure which then exists at the inlet ports 16 in the valve body 10. The control pin 37 extends into a pressure chamber 39 within the valve body 10 between the end cap 24 and the left end of the main valve member 17. The control pin has a reduced inner end segment 38 which projects through the passage 31 with an appreciable clearance and engages the front end 35 of the pilot valve poppet 33.

In accordance with the present invention, the cross-sectional area of the outer end portion of the control pin 37 which is slidably disposed in the end cap bore 36 is substantially greater than the effective seated area of the pilot valve (i.e., the cross-sectional area of the passage 31) for a purpose which is explained hereinafter.

Figure 1:
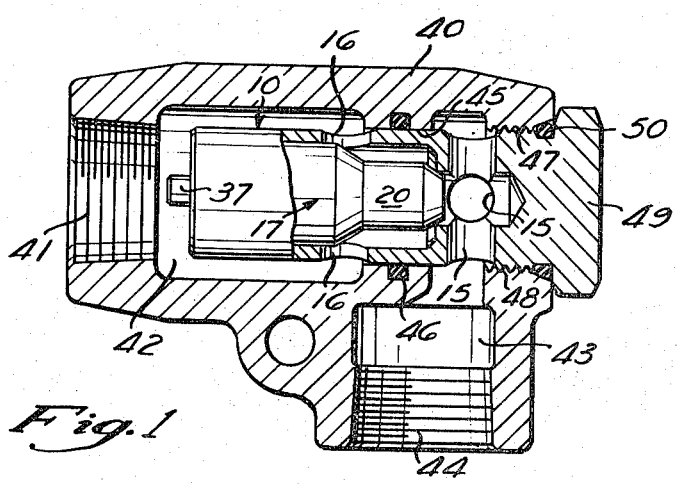
FIG. 1 is a longitudinal sectional view of an assembly in which a first embodiment of the present valve is mounted in a housing, with the valve itself being shown partly in elevation and partly in longitudinal section.

As shown in FIG. 1, this valve is mounted in a housing 40 having an inlet port 41 leading into an inlet chamber 42 and an outlet chamber 43 leading to an outlet port 44. Housing 40 has a short bore 45 between its inlet and outlet chambers 42 and 43 with a groove in which an O-ring 46 of rubber or rubberlike material is seated. To the right of the outlet chamber 43 and in line with the bore 45, the housing 40 has a screw-threaded opening 47 which receives a complementary externally screw-threaded portion 48 on the valve body 10 to the right of the outlet passages 15 in the latter.

The valve body 10 has an enlarged flange or head 49 on its right end. An O-ring 50 of rubber or rubberlike material is engaged under compression between this valve body flange and the housing 40 to prevent leakage past the threadedly engaging portions 47 and 48 of the housing 40 and the valve body. The O-ring 46 carried by the housing 40 sealingly engages the outside of the valve body 10 between the latter's inlet ports 16 and outlet passages 15 to prevent leakage between them.

As shown in the drawing, the inlet ports 16 and the outer end of the control pin 37 of the valve are exposed at all times to the fluid pressure in the inlet chamber 42 of the housing 40. The outlet passages 15 in the valve are in direct fluid communication with the outlet chamber 43 of the housing 40.

In the operation of this valve, normally the main valve spring 27 maintains the main valve member 17 seated against the main valve seat 13, and the pilot valve spring 34 maintains the poppet 33 seated against the pilot valve seat 30. The inlet fluid within the inlet chamber 42 of housing 40 leaks past the control pin 37, along the orifice passage between the control pin and the bore 36 in the end cap 24, so that the fluid pressure within the housing bore 11 to the left of the main valve member 17 and the poppet 33 is substantially equal to the pressure in the inlet chamber 42 when the pilot valve is closed.

The fluid force acting on the pilot valve poppet 33 and tending to unseat it is equal to the inlet fluid pressure times the cross-sectional area of the passage 31. This fluid force is opposed by the pilot valve spring 34 and the back pressure, if any, in the bore 28 in the main valve member 17 begin behind the pilot valve poppet 33. At some predetermined fluid pressure differential between the inlet and outlet sides of the pilot valve poppet 33 (e.g., 1,500 pounds per square inch) the poppet will be unseated, thereby connecting the pressure chamber 39 between the back end of the main valve member 17 and the end cap 24 to the lower pressure outlet passages 15. Flow through the orifice passage produces a fluid pressure unbalance acting on the main valve member 17 (to the left in the drawing) which is sufficient to overcome the opposing force of the main valve spring 27, and consequently the main valve member 17 becomes unseated to connect its inlet ports 16 directly to its outlet passages 15. This condition prevails as long as the pilot valve poppet 33 remains unseated.

Immediately after it is initially unseated, as described, the pilot valve poppet 33 is held unseated by the fluid pressure in chamber 39 applied against the area of the pilot valve seat and a force applied by the control pin 37, whose outer end is exposed to the inlet fluid pressure and whose inner end is exposed to the pressure in chamber 39. The clearance between the control pin 37 and the bore 36 in the end cap 24 provides the orifice across which this pressure differential is maintained. It will be evident, then, that as soon as the pilot valve poppet 33 is unseated, it is maintained in the open position by the combined action of the fluid pressure in chamber 39 and the force exerted against the pilot valve poppet 33 by the control pin 37. The force exerted directly by the fluid is equal to the area of the pilot valve seat 30 multiplied by the pressure in chamber 39. The force exerted by the control pin 37 is equal to the cross-sectional area of the outer end portion of the control pin 37 multiplied by the pressure differential across the length of the orifice passage between the end cap bore 36 and the control pin 37.

In accordance with the present invention, the cross-sectional area of the outer end portion of the control pin 37 is substantially greater than the effective seated area of the pilot valve poppet 33. Because of this, the inlet fluid pressure which will be just insufficient to maintain the pilot valve open is much lower than the inlet fluid pressure which was required to open it initially. (It will be understood that when the pilot valve poppet 33 is reseated, the main valve member 17 will also be reseated because the closing of the pilot valve will remove the fluid pressure differential tending to hold the main valve open.) That is, the present valve will close only after the inlet pressure has dropped to a value much lower than the pressure required to open it. This is in contrast with prior valves of this general type, as exemplified by U.S. Pat. No. 2,827,075, which will close as soon as the inlet pressure drops just slightly below the pressure at which it opened.

In one practical embodiment, the present valve opens at a pressure differential of 1,500 p.s.i. between its inlet and outlet passages, but it remains open until this pressure differential drops to 800 p.s.i. This enables the present valve to be used in a system having a relatively inexpensive pump which can operate without danger of failure or damage at the higher pressure (e.g., 1,500 p.s.i.) for only a short period of time, such as for lifting a load, but can operate indefinitely at the lower pressure (e.g., 800 p.s.i.) to maintain the load in its elevated position for an extended period of time.

Figure 3:
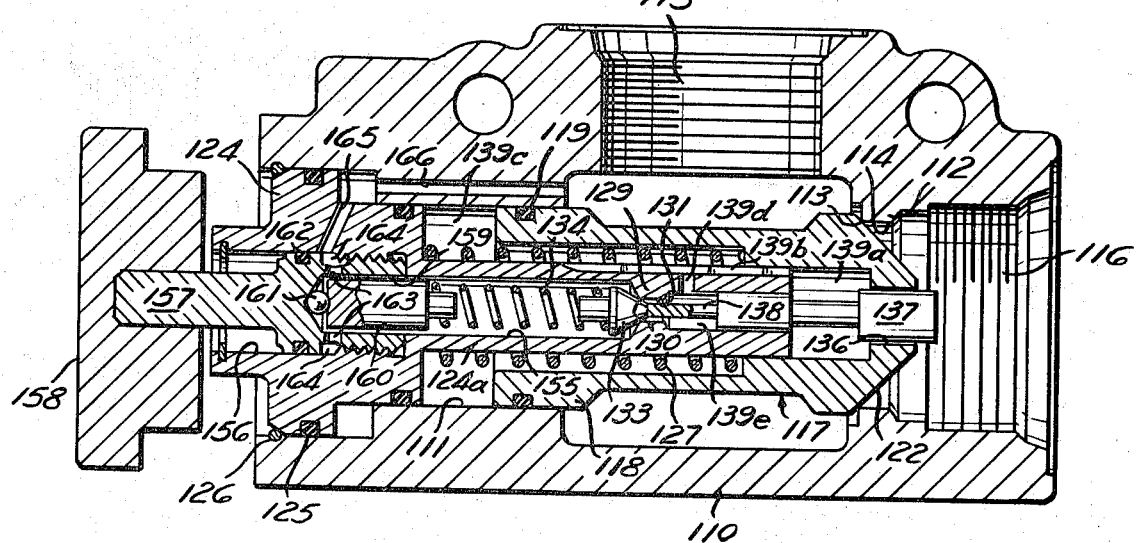
FIG. 3 is a similar view of a second embodiment of the present valve.

FIG. 3 shows a second embodiment of the present invention which differs from the embodiment of FIGS. 1 and 2 principally in the fact that the control pin is slidable in a bore formed in the main valve member itself, instead of in an end cap on the valve body as in FIG. 1.

Corresponding parts of the FIG. 3 valve are given the same reference numerals, plus 100, as the already-described parts of the valve of FIGS. 1 and 2, and the detailed description of these parts will not be repeated.

The end cap 124 on the valve body 110 has a reduced diameter projection 124a which extends to the right into the main valve member 117. This end cap projection 124a has a longitudinal bore 155 in which the pilot valve poppet 133 and its spring 134 are positioned. The pilot valve seat is formed by a circular inside corner 130 on an inwardly projecting annular wall 129 of the end cap projection 124a.

At its outer end the end cap 124 has an enlarged counterbore 156 whose inner end is screw-threaded to receive an adjusting screw 157 carrying a knob 158 on its outer end to the left of the valve body 110. The inner end of the adjusting screw has a recess 159 which loosely receives a pressure plate 160 engaging the left end of the pilot valve spring 134. A steel ball 161 is engaged between the adjusting screw 157 and the pressure plate 160.

The adjusting screw 157 carries an O-ring 162 of rubber or rubberlike material which sealingly engages the wall of the counterbore 156 in the end cap 124. A short distance to the right of this O-ring, the adjusting screw has a plurality of radial openings 163 extending between the recess 159 in the adjusting screw and an annular groove 164 on its periphery. This peripheral groove 164 is in fluid communication with one of more cross passages 165 in the end cap 124 which, in turn, communicate with a longitudinal passage 166 in the valve body 110 leading to the outlet passage 115. These passages and grooves 163—166 connect the recess 159 in the adjusting screw to the valve body outlet passage 115, and the pressure plate 160 has a sufficient radial clearance from this recess 159 and the bore 155 in the end cap projection 124a such that under normal conditions the fluid pressure in bore 155 behind the pilot valve poppet 133 is approximately equal to the pressure at the valve body outlet passage 115.

In accordance with this embodiment of the present invention the outer end portion of the control pin 137 is slidably received, with a slight clearance, in a longitudinal passageway or bore 136 formed in the front end 122 of the main valve member 117. The cross-sectional area of this outer end portion of the control pin is substantially greater than the cross-sectional area of the passage 131 just beyond the pilot valve seat 130, for the reasons already explained.

The main valve member 117 provides a space 139a surrounding the control pin 137 between the inner end of the end cap projection 124a and the left end of the bore 136. The end cap projection 124a has a longitudinal groove 139b on its periphery which connects this space 139a to a space 139c between the left end of the main valve member 117 and the end cap 124. The end cap projection 124a also has a radial passage 139d connecting this longitudinal passage 139b to a space 139e directly in front of the passage 131 leading to the pilot valve seat 130. These spaces, groove and passage 139a–139e together constitute a pressure chamber corresponding to the pressure chamber 39 in the valve of FIGS. 1 and 2.

In the operation of the FIG. 3 valve, the pilot valve poppet 133 will be held seated against the pilot valve seat until the pressure within the pressure chamber 139a–139e rises to a predetermined value sufficient to overcome the seating force exerted by the pilot valve spring 134 and the back pressure, if any, in the bore 155 behind the poppet. The fluid pressure in this pressure chamber 139a–139e is substantially equal to the pressure at the inlet passage 116 due to the leakage along the orifice passage between the bore 136 and the outer end of the control pin 137 when the pilot valve is closed.

When this predetermined opening pressure is reached, the pilot valve poppet 133 will be unseated, thereby connecting the pressure chamber 139a–139e to the valve outlet passage 115 by way of the bore 155 in the end cap projection 124a, passages 163, groove 164 and passages 165 and 166. The resulting fluid pressure unbalance on the main valve member 117 will cause it to open immediately.

Once the pilot valve opens initially, the control pin 137 immediately provides a force in addition to the force exerted directly by the fluid pressure on the pilot valve poppet which tends to hold the latter off its seat. That is, while the fluid pressure at which the pilot valve will open initially is determined by the seated area of the pilot valve poppet 133, once this poppet is unseated it will remain unseated until a lower inlet fluid pressure is reached as determined by the cross-sectional area of the outer end of the control pin 137. Accordingly, by appropriate design of the relative proportions of the seated area of the pilot valve poppet 133 and the cross-sectional area of the outer end of the control pin, the main valve has a substantially lower closing pressure than its opening pressure.

I claim:

1. A pilot-operated valve comprising a normally closed main valve, a normally closed pilot valve operable to cause said main valve to open in response to the opening of the pilot valve, means defining a pressure chamber at the inlet side of said pilot valve and a passageway exposed at its outer end to the inlet fluid pressure acting on the main valve and having its inner end connected to said pressure chamber, a control member reciprocably mounted in said passageway with its outer end exposed to the inlet fluid pressure acting on the main valve and having its inner end engageable with the pilot valve, said passageway and said control member providing an orifice passage between them which permits leakage of inlet fluid into said pressure chamber for opening the pilot valve when the inlet fluid pressure acting on the main valve rises to a predetermined value, said pressure chamber, when the pilot valve is closed, communicating with the inlet fluid pressure only through said orifice passage, said orifice passage, after the pilot valve is first opened, maintaining said pressure chamber at a substantially lower fluid pressure than the inlet pressure so as to urge said control member inwardly to a position holding the pilot valve open, and said control member having a cross-sectional area at its outer end which is substantially greater than the seated area of the pilot valve so that the control member is maintained in a position holding the pilot valve open until the inlet fluid pressure drops to a value appreciably below the value at which it first opened the pilot valve.

2. In a pilot-operated valve having inlet and outlet passages and a main valve seat between said inlet and outlet passages, a main valve member engageable with said main valve seat, main valve spring means biasing said main valve member against said main valve seat, a pilot valve seat between said inlet and outlet passages, a pilot valve member engageable with said pilot valve seat, pilot spring means biasing said pilot valve member against said pilot valve seat, said valve presenting a pressure chamber at the opposite side of said pilot valve seat from said pilot valve member and a bore leading into said chamber from said inlet passage, and a control pin extending slidably through said bore into said pressure chamber and having a reduced inner end for engagement with said pilot valve member, said control pin having a clearance in said bore permitting leakage of fluid along the bore from said valve inlet passage to said pressure chamber for unseating the pilot valve member to connect said valve inlet passage and said pressure chamber to said valve outlet passage for unseating the main valve member when the fluid pressure at the valve inlet passage reaches a predetermined value, said pressure chamber, when said pilot valve member is seated, being blocked from said inlet passage except through said clearance between said bore and the control pin, and said clearance between said bore and the control pin providing an orifice for maintaining a fluid pressure differential between the valve inlet passage and said pressure chamber to urge said control pin to a position holding said pilot valve member unseated, the improvement wherein the cross-sectional area of said control pin in said bore is substantially greater than the seated area of said pilot valve member so as to maintain said control pin positioned holding said pilot valve member unseated until the pressure at said valve inlet chamber drops appreciably below the pressure at which said pilot valve member was unseated.

3. In a pilot-operated valve comprising a valve body having inlet and outlet passages and a main valve seat between said inlet and outlet passages, a main valve member reciprocably mounted in said valve body and engageable with said main valve seat, main valve spring means in said valve body normally holding said main valve member against said main valve seat, a pilot valve within said valve body comprising a pilot valve seat, a movable pilot valve member engageable with said pilot valve seat, and pilot spring means normally holding said pilot valve member against said pilot valve seat, passage means connecting the outlet side of the pilot valve to said valve outlet passage, means a defining a pressure chamber at the inlet side of said pilot valve and at the opposite side of said main valve member from said main valve seat, means defining a bore leading into said pressure chamber from said valve inlet passage, and a reciprocable control member extending slidably through said bore into said pressure chamber and having an outer end portion exposed to the fluid pressure at said valve inlet passage and a reduced inner end for engagement with said pilot valve member, said control member having a clearance in said bore permitting leakage of fluid along the bore from said valve inlet passage to said pressure chamber for unseating the pilot valve member to connect said valve inlet passage and said pressure chamber to said valve outlet passage for unseating the main valve member when the fluid pressure at the valve inlet passage reaches a predetermined value, said pressure chamber, when said pilot valve member is seated, communicating with said inlet passage only through said clearance between said bore and said control member, and said clearance between said bore and the control member, after said pilot valve member is unseated, providing an orifice passage for maintaining a fluid pressure differential between the valve inlet passage and said pressure chamber to urge said control member to a position holding said pilot valve member unseated, the improvement wherein the cross-sectional area of said control member in said bore is substantially greater than the seated area of said pilot valve member so as to maintain said control member positioned holding said pilot valve member unseated until the pressure at said valve inlet chamber drops appreciably below the pressure at which said pilot valve member was first unseated.

4. A valve according to claim 3, wherein said pilot valve seat is on said main valve member, and said passage means connecting the outlet side of the pilot valve to said valve outlet passage extends through said main valve member, and said bore is in an end cap on said valve body.

5. In a pilot-operated valve comprising a valve body having inlet and outlet passages and a main valve seat between said inlet and outlet passages, a main valve member reciprocably mounted in said valve body and engageable with said main valve seat, main valve spring means in said valve body normally holding said main valve member against said main valve seat, a pilot valve within said valve body comprising a pilot valve seat on a member separate from the main valve member and supported by the valve body, a movable pilot valve member engageable with said pilot valve seat, and pilot spring means normally holding said pilot valve member against said pilot valve seat, passage means connecting the outlet side of the pilot valve to said valve outlet passage, means defining a pressure chamber at the inlet side of said pilot valve and at the opposite side of said main valve member from said main valve seat, means defining a bore formed in said main valve member at the end thereof which is engageable with said main valve seat and leading into said pressure chamber from said valve inlet passage, and a reciprocable control member extending slidably through said bore into said pressure chamber and having an outer end portion exposed to the fluid pressure at said valve inlet passage and a reduced inner end for engagement with said pilot valve member, said control member having a clearance in said bore permitting leakage of fluid along the bore from said valve inlet passage to said pressure chamber for unseating the pilot valve member to connect said valve inlet passage and said pressure chamber to said valve outlet passage for unseating the main valve member when the fluid pressure at the valve inlet passage reaches a predetermined value, said pressure chamber, when said pilot valve member is seated, communicating with said inlet passage only through said clearance between said bore and said control member, and said clearance between said bore and the control member, after said pilot valve member is unseated, providing an orifice passage for maintaining a fluid pressure differential between the valve inlet passage and said pressure chamber to urge said control member to a position holding said pilot valve member unseated, the improvement wherein the cross-sectional area of said control member in said bore is substantially greater than the seated area of said pilot valve member so as to maintain said control member positioned holding said pilot valve member unseated until the pressure at said valve inlet chamber drops appreciably below the pressure at which said pilot valve member was first unsealed.